Figure 1:
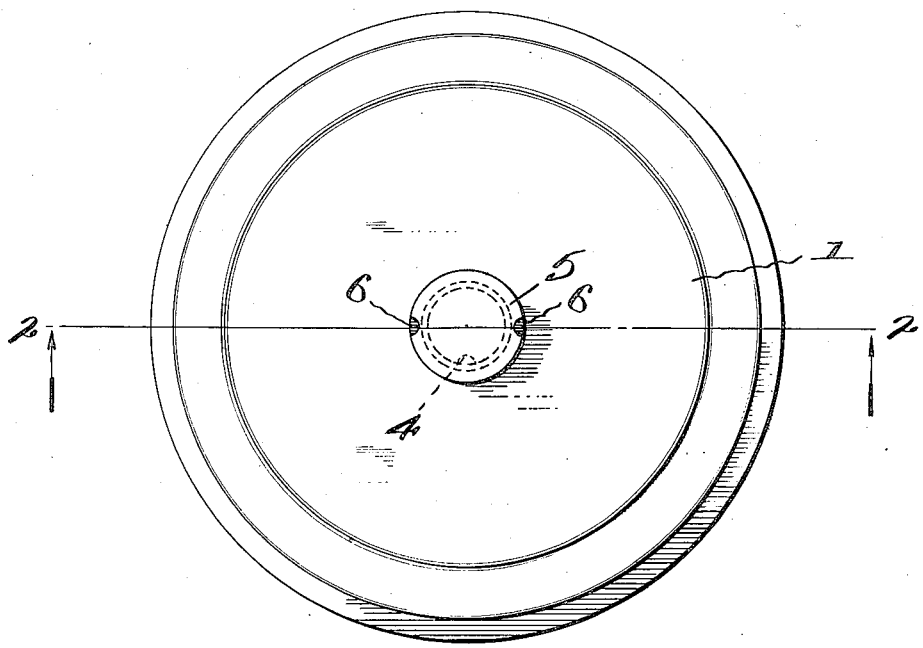

T. M. PASCHAL.
CHEMICAL HEATER AND COMPOSITION OF MATTER THEREFOR.
APPLICATION FILED NOV. 22, 1913. RENEWED APR. 4, 1916.

1,203,776. Patented Nov. 7, 1916.

Witnesses
Edwin Beller.
H. W. Primm.

Inventor
Thomas M. Paschal,
by Wilkinson, Insta & MacKaye,
Attorneys.

UNITED STATES PATENT OFFICE.

THOMAS M. PASCHAL, OF SAN ANTONIO, TEXAS.

CHEMICAL HEATER AND COMPOSITION OF MATTER THEREFOR.

1,203,776.     Specification of Letters Patent.     Patented Nov. 7, 1916.

Application filed November 22, 1913, Serial No. 802,361. Renewed April 4, 1916. Serial No. 88,957.

*To all whom it may concern:*

Be it known that I, THOMAS M. PASCHAL, a citizen of the United States, residing at San Antonio, in the county of Bexar and State of Texas, have invented certain new and useful Improvements in Chemical Heaters and Compositions of Matter Therefor; and I do hereby declare the following to be a full, clear, and exact description of the invention, such as will enable others skilled in the art to which it appertains to make and use the same.

My invention relates to a heater where the thermal change is produced by some chemical or physical change, *i. e.*, a chemical heater, and the composition which is employed in such device.

Various devices are known, and compositions as well, for filling them, in which the evolution of heat energy is effected by means of some chemical re-agent.

Sodium hyposulfite is a substance, the heat of which is due to the fact that this salt is very soluble at high temperatures in water; in fact, soluble in its own water of hydration. On cooling, the crystals of the salt separate out from the mother liquor, and the water may be used up in the formation of the crystals, and the mass becomes completely solid.

It is a well known law of physics that when a substance passes from the liquid to the solid form, it evolves heat, and conversely when it passes from the solid to the liquid it absorbs heat. If the transition can be prolonged, of course, the evolution of heat is prolonged, and made more gradual. If the phenomenon can be modified, so as to increase the degree, or amount of solution, at high temperatures, and decrease it at low temperatures, greater heat will be produced.

My invention, so far as composition is concerned, relates to this.

I find that the crystallization, from a supersaturated solution of the salt, is augmented on cooling by the addition of a small per cent., say 2%, or less, of rock salt, *i. e.*, sodium chlorid, preferably in a finely divided solid form.

I am not able to say, with certainty, what part the salt plays in the process; but my theory is that the salt increases the degree of solution at high temperatures and diminishes that solution at low temperatures, so that at high temperatures more of the hyposulfite is dissolved; and at low temperatures it is more completely crystallized out than if the salt were not used.

I find that by the addition of a small percentage of a mineral earth, found near San Antonio, Texas, the efficiency of the composition seems to be increased. This mineral earth has certain radio-active properties, which have a marked therapeutic value. I find that the presence of this mineral earth in my composition gives me somewhat better results, *i. e.*, the re-crystallization is more prompt and certain. Probably this is due to the physical presence in the solution of a certain amount of sand-like material, forming granular cores, upon which the formation of crystals may begin. I am of the opinion that the formation of crystals is also controlled, to some extent, by the radio-active quality of the earth. I believe that this quality hastens the genesis of the individual crystals through some obscure action, the rationale of which I am not sure about. I know that the presence of this earth gives me better results, besides adding certain therapeutic qualities to the compound.

In using my composition, I heat it until it becomes liquid. I then pour it into any suitable container, and hermetically seal said container; and the operation is as will be hereinafter described.

Reference is had to the accompanying drawings, in which similar reference symbols indicate corresponding parts in the several views.

Figure 2:
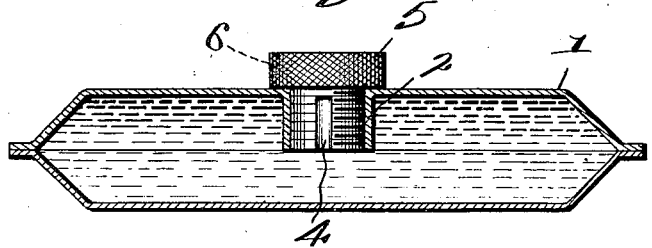
Figure 3:
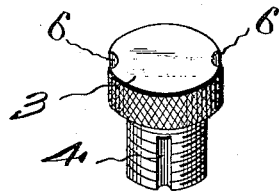

Figure 1 represents a top view; Fig. 2 a section through a container such as I employ; and Fig. 3 is a view of the plug, for closure.

I have represented a container usable as a foot warmer, or like a hot water bag. This container 1 consists of a short disk-shaped holder, preferably with flat sides; but the shape of the holder is not important.

I provide at one side, as at 2, an opening through which the receptacle may be filled. To close this opening, I provide a plug 3, which screws down into the opening. On one side of this plug is the slot or recess 4, to admit air. A milled head 5 is preferably provided, in which may be placed, if desired, holes or notches for a spanner, in case the screw threads get stuck.

I have found that the setting of the crystals may be hastened by the admission of air. For this reason, I provide the slot 4, mentioned above. When the plug is screwed home, access of air is prevented. When the plug is lifted, a little air enters, and the crystallization begins at once; the speed of crystallization, and the consequent degree of heat, varies in a measure with the volume of air admitted, which may be varied by increasing or decreasing the slot opening. The crystallization proceeds in a widening zone, having the air inlet as its center, and in order to get the best results, the air inlet should be located in a central position, so that a larger mass of material may be subjected to the influx of air, but, if desired, a series of openings may be provided.

In using the device, assuming that the container is filled with crystals, the plug is screwed home, and the container placed in boiling water, and boiled from 10 to 15 minutes. It is then removed, and may be laid aside for an indefinite period. Usually, it will cool as soon as any other liquid would cool. When I wish to use it to generate heat, I turn the plug enough to admit a little air, when the warmth begins at once. The generation of warmth may be hastened by shaking the container.

Having thus described my invention, what I claim and desire to secure by Letters Patent of the United States is:—

1. A compound for releasing heat by crystallization from a supersaturated solution, and for storing heat by re-solution, consisting of a main ingredient for the purpose, and a second ingredient which augments the formation of crystals at low temperatures, and also augments under heat their re-solution.

2. A compound for releasing heat by crystallization from a supersaturated solution and for storing heat by re-solution consisting of sodium hyposulfite, and a second ingredient which augments the formation of crystals at low temperatures and also augments their re-solution at high temperatures.

3. A compound for releasing heat by crystallization from a supersaturated solution and for storing heat by re-solution, consisting of an alkali hyposulfite as a main ingredient, and as a second ingredient for augmenting the formation of crystals, and also for augmenting their re-solution, sodium chlorid.

4. A chemical heat storing compound consisting of sodium hyposulfite and rock salt.

5. A chemical heat storing compound, consisting of sodium hyposulfite ninety-eight per cent. or more and two per cent. or less of rock salt.

6. A compound for storing heat consisting of sodium hyposulfite, rock salt, and a radio-active substance.

7. A compound for storing heat consisting of sodium hyposulfite ninety-eight per cent. or more, sodium chlorid two per cent. or less, and in addition a mineral earth possessing radio-active qualities.

8. A chemical heat storing compound consisting of an alkali hyposulfite, an alkali chlorid, and a radio-active mineral earth.

9. A chemical heater consisting of a vessel provided with a closing device readily openable to the air, charged with a compound for releasing heat by crystallization from a supersaturated solution, consisting of a main ingredient for the purpose, and a second ingredient for augmenting the formation of crystals at low temperatures, the compound responding, for forming crystals, to the admission of air.

10. A chemical heater consisting of a vessel provided with a closure readily openable to the air, charged with a compound consisting of an alkaline hyposulfite, and sodium chlorid.

11. A chemical heater consisting of a vessel provided with a closure readily openable to the air and charged with a mixture of sodium chlorid, i. e. rock salt, and a radio-active mineral earth.

In testimony whereof I affix my signature in presence of two witnesses.

THOMAS M. PASCHAL.

Witnesses:
ERNEST WILKINSON,
S. W. SCHARFF.